United States Patent

Jalie

[11] 4,289,387
[45] Sep. 15, 1981

[54] OPHTHALMIC SPECTACLE LENSES HAVING A HYPERBOLIC SURFACE

[76] Inventor: Mohammed Jalie, Lanchbury House, 32 Ferndene Rd., London, England, SE24 OAB

[21] Appl. No.: 607

[22] Filed: Jan. 2, 1979

[30] Foreign Application Priority Data

Aug. 9, 1978 [GB] United Kingdom ............... 32738/78

[51] Int. Cl.³ .......................... G02B 3/04; G02C 7/02
[52] U.S. Cl. .................................... 351/159; 350/432; 351/167
[58] Field of Search ................. 351/159, 167; 350/189

[56] References Cited

U.S. PATENT DOCUMENTS

| | | | |
|---|---|---|---|
| 2,530,397 | 11/1950 | Merte | 350/189 |
| 3,482,906 | 12/1969 | Volk | 351/160 R |
| 3,950,082 | 4/1976 | Volk | 351/169 |

*Primary Examiner*—John K. Corbin
*Assistant Examiner*—Scott J. Sugarman
*Attorney, Agent, or Firm*—Pollock, Vande Sande & Priddy

[57] ABSTRACT

Ophthalmic spectacle lenses are provided with powers ranging from $-20$ to $+7$ diopters, for minus powered lenses, with a posterior surface of a hyperboloidal form and, for positive powered lenses with an anterior surface of a hyperboloidal form. Such hyperboloidal forms are computed by modifying the conventional formulae used for "Best Form" spherical lens surfaces from $y^2 = 2000(n'-n) \times /Fo - x^2$ to the formulae $y^2 = 2000(n'-n) \times /Fo - px^2$; where 'p' has a value ranging from 0 to $-4$, Fo is the optical power of the lens at the intersection of the lens surface and the optic axis, Fo being given as follows: $Fo = 1000(n'-n)/ro$ where ro is the radius of the lens surface at the optic axis, and where $(n'-n)$ is the difference between the refractive indices on opposite sides of the lens surface taken in the direction of light travel to the eye through the lens, all dimensions in the formulae being in millimeters and x and y being orthogonal co-ordinates.

6 Claims, 5 Drawing Figures

OPHTHALMIC SPECTACLE LENSES HAVING A HYPERBOLIC SURFACE

FIELD OF THE INVENTION

This invention relates to ophthalmic spectacle lenses for the power range most frequently required for the correction of vision.

BACKGROUND OF THE INVENTION

Hitherto, the anterior and posterior surfaces of an ophthalmic spectacle lens have either both been of a spherical form or one of the surfaces has been made spherical and the other toroidal if a vision defect known as astigmatism was to be corrected for. The particular radii for the surfaces have been selected by the lens manufacturers so as to yield the best compromise between optical errors in the margins of the lens, lens weight and the flat plate thickness of the lens, and such lenses are known as "Best Form" lenses.

SUMMARY OF THE INVENTION

It is an object of the present invention to provide an ophthalmic spectacle lens with surfaces of a shape which permit an improvement to be made to such known "Best Form" lenses.

It is a more particular object of the invention to provide ophthalmic spectacle lenses with reduced optical errors in the margins of the lens, a reduced flat plate thickness and a reduced weight.

In accordance with the invention, ophthalmic spectacle lenses of powers ranging from $-20$ diopters to $+7$ diopters are provided, for minus powered lenses, with a posterior surface of a hyperboloidal form and, for positive powered lenses with an anterior surface of a hyperboloidal form. The hyperboloidal form is computed by modifying the conventional formulae used to define the sectional locus of a "Best Form" spherical lens surface from $y^2 = 2000(n'-n) \times /Fo - x^2$, to the formulae $y^2 = 2000(n'-n) \times /Fo - px^2$; where 'p' has a value ranging from 0 to $-4$, Fo is the optical power of the lens at the intersection of the lens surface and the optic axis, Fo being given as follows: $Fo = 1000(n'-n)/ro$ where ro is the radius of the lens surface at the optic axis, and where $(n'-n)$ is the difference between the refractive indices on opposite sides of the lens surface taken in the direction of light travel to the eye through the lens, all dimensions in the formula being in millimeters and x and y being orthogonal co-ordinates.

It is preferred that the lens surface opposing said hyperboloidal surface be spherical, or toroidal if correction for astigmatism is required.

Ophthalmic lenses in accordance with the invention have reduced flate plate thickness, weight and marginal errors, which reduces the discomforts experienced by wearers of spectacles incorporating lenses according to the invention.

In order that the invention may be more fully understood and readily carried into effect, embodiments thereof will now be described by way of example and by way of comparison with prior art ophthalmic spectacle lenses, reference being had to the accompanying drawings.

DESCRIPTION OF PREFERRED EMBODIMENT

Figure 1:
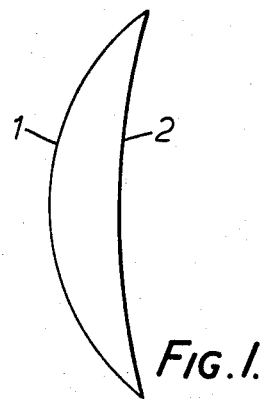
FIG. 1 is an axial sectional view of a conventional positive power "Best Form" ophthalmic lens.
Figure 3:
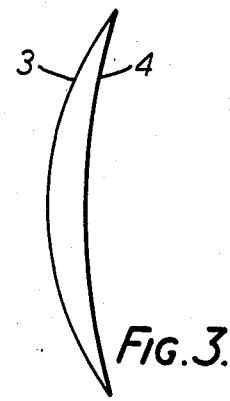
FIG. 3 is an axial sectional view of positive power ophthalmic lens in accordance with the invention.

As can be seen from FIGS. 1 and 3, the conventional spectacle lenses have spherical surfaces 1 and 2 and the axial sectional shape of their spherical surfaces is defined by the formula $y^2 = 2000(n'-n) \times /Fo - x^2$, where x and y are orthogonal co-ordinates, $(n'-n)$ is the difference in the refractive indices of the media bounding the surface, the difference being taken in the direction in which light passes through the lense to the eye, and Fo being the optical power of the lens as defined hereinbefore, all dimensions being in millimeters.

However, the ophthalmic spectacle lens in accordance with the present invention includes a surface which is hyperboloidal rather than spherical and has an axial sectional shape the locus of which is described by the following formula.

$$y^2 = 2000(n'-n) \times /Fo - px^2 \quad (1)$$

where $0 < p > -4$, the other parameters of the equation being as previously mentioned, and x and y being orthogonal co-ordinates.

In the figures, the eye is intended to be on the right hand side of each lens, and the surfaces of the lens closest and furthermost to the eye are called in this specification the anterior and posterior surfaces, respectively.

Figure 2:
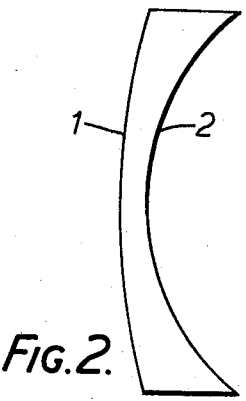
FIG. 2 is an axial sectional view of a conventional negative power "Best Form" ophthalmic lens.

In FIG. 2 there is shown a positive power lens in accordance with the invention. The anterior lens surface 1 is hyperboloidal and has a sectional locus defined by equation (1). The posterior surface 2 of the lens is spherical, or toroidal if astigmatism is to be corrected.

Figure 4:
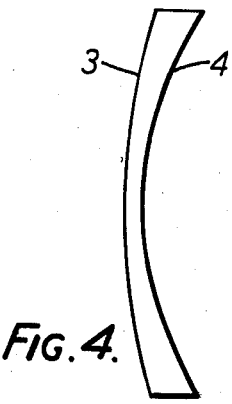
FIG. 4 is an axial sectional view of a negative power ophthalmic lens in accordance with the present invention.

An example of a minus power lens in accordance with the invention is shown in FIG. 4. This lens has a posterior lens surface 4 which is hyperboloidal and has a sectional locus in accordance with equation (1); the lens has an anterior surface 3 which is spherical or perhaps toroidal if it is desired to correct for astigmatism.

It has been found that both positive and negative powered spectacle lenses in accordance with the present invention have the advantage of reducing marginal errors of the lenses, i.e., aberrations which occur in regions of the lenses away from the optic axis upon the eye being rotated away from the optic axis. Also, the present invention permits the flat plate thickness (defined hereinafter) and lens weight to be reduced as compared with conventional spherical surface spectacle lenses of the same power. These advantages will now be illustrated by the following tables of lens characteristics, in which the characteristics of conventional lenses with two spherical surfaces are compared with lenses of the invention of the same power and having one spherical surface and one hyperboloidal surface in accordance with equation (1) above.

TABLE I

| | Lens power + 3.00 diameter 50mm | | | | | |
|---|---|---|---|---|---|---|
| | $F_1°$ | t | $F^1{}_s$ | OAE | MOE | FPT |
| Conventional Lens | +8.50 | 3.6 | +2.79 | −0.02 | −0.22 | 6.8 |
| Lens of the Invention | +4.75 | 3.4 | +2.80 | −0.02 | −0.21 | 4.2 |

TABLE II

| | Lens power − 4.00 diameter 60mm | | | | | |
|---|---|---|---|---|---|---|
| | $F_1°$ | t | $F^1{}_s$ | OAE | MOE | FPT |
| Conventional Lens | +5.00 | 1.6 | −3.76 | +0.09 | +0.28 | 9.5 |
| Lens of the Invention | +1.25 | 1.6 | −3.81 | 0.00 | +0.19 | 6.2 |

In the tables, the following terminology is used.

$F_{10}$ = Power of lens anterior surface at its intersection with the lens optic axis (measured in diopters)

t = Thickness of the lens measured along optic axis (mm)

$F^1{}_s$ = Sagittal oblique vertex sphere power (diopters)

OAE = Oblique astigmatic error (diopters)

MOE = Mean Oblique error (diopters)

FPT = The flat plate thickness, i.e., the distance between two flat plates held in contact with opposite sides of the lens (mm)

In the tables, $F^1{}_s$, OAE and MOE are given for a 35° rotation of the eye from the optic axis.

From the tables it will be seen that there is an overall reduction in marginal errors for the lenses of the invention as compared with the conventional lenses of comparable power. Moreover, the flat plate thickness is reduced substantially, which is a desirable characteristic for spectacle lenses, as is well appreciated by those skilled in the art. Furthermore, the weight of the lenses of the invention is reduced substantially.

Figure 5:
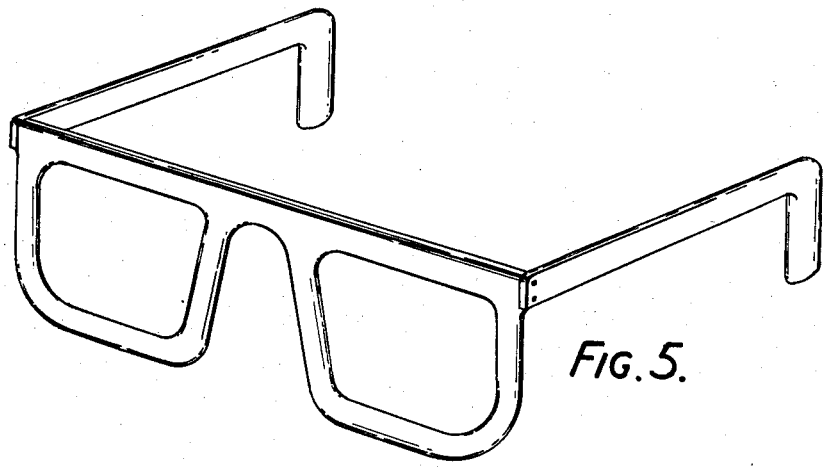
FIG. 5 shows a pair of spectacles including lenses according to the present invention.

FIG. 5 shows a pair of spectacles incorporating lenses of the invention, and it will be appreciated that the reduced weight of the lenses provides a weight reduction for the spectacles, thereby reducing discomfort to the wearer.

It will be appreciated that the lenses of the invention can be made of plastic material by casting or molding, and could even be made of glass by grinding. Moreover, while in the embodiments described herein, the surface opposite the described hyperboloidal surface is spherical or toroidal, it could be aspheric if desired.

I claim:

1. An ophthalmic spectacle lens comprising a singlet having an optical axis and power within a range of −20 diopters to +7 diopters, the singlet having anterior and posterior surfaces which are both curved, at least one of said surfaces being of a hyperboloidal form symmetrically disposed about said optical axis, said hyperboloidal form having in axial section a locus defined by:

$$y^2 = 2000 \frac{(n' - n)x}{F_0} - px^2$$

wherein p has a value between 0 and −4 inclusive, and $$F_0 = \frac{1000(n' - n)}{r_0}$$

where $r_0$ is the radius of said surface at the optic axis of the lens and $(n' - n)$ is the difference between the refractive indices of the media bounding said surface, x and y being orthogonal co-ordinates and all dimensions being in millimeters.

2. An ophthalmic spectacle lens as claimed in claim 1 including a spherical surface on the side of the lens opposite to said hyperboloidal surface.

3. An ophthalmic spectacle lens as claimed in claim 1 including a toroidal surface on the side of the lens opposite to said hyperboloidal surface.

4. A pair of spectacles including at least one ophthalmic spectacle lens as claimed in claim 1.

5. An ophthalmic spectacle lens of a negative power of up to −20 diopters and having a posterior surface of hyperboloidal form which in an axial section of the lens has a shape defined by:

$$y^2 = 2000 \frac{(n' - n)x}{F_0} - px^2$$

wherein p has a value between 0 and −4 inclusive, and $$F_0 = \frac{1000(n' - n)}{r_0}$$

where $r_0$ is the radius of said surface at the optic axis of the lens and $(n' - n)$ is the difference between the refractive indices of the media bounding said surface, x and y being orthogonal co-ordinates and all dimensions being in millimeters.

6. An ophthalmic spectacle lens of a positive power of up to +7 diopters and having an anterior surface of hyperboloidal form which in an axial section of the lens has a shape defined by:

$$y^2 = 2000 \frac{(n' - n)x}{F_0} - px^2$$

wherein p has a value between 0 and −4 inclusive, and $$F_0 = \frac{1000(n' - n)}{r_0}$$

where $r_0$ is the radius of said surface at the optic axis of the lens and $(n' - n)$ is the difference between the refractive indices of the media bounding said surface, x and y being orthogonal co-ordinates and all dimensions being in millimeters.

* * * * *